F. H. AVERS.

INDICATING DEVICE FOR MOVING PICTURE FILMS.

APPLICATION FILED MAY 4, 1915.

Reissued Oct. 8, 1918. 14,532.

2 SHEETS—SHEET 1.

Witnesses:
L. E. Johnston
M. E. Eveland

Inventor
Franklin H. Avers

By his Attorney W. B. Morton

F. H. AVERS.

INDICATING DEVICE FOR MOVING PICTURE FILMS.

APPLICATION FILED MAY 4, 1915.

Reissued Oct. 8, 1918.

14,532.

2 SHEETS—SHEET 2.

Witnesses:
L. E. Johnston
M. E. Eveland

Inventor
Franklin H. Avers,

By his Attorney W. B. Morton

UNITED STATES PATENT OFFICE.

FRANKLIN H. AVERS, OF PORTAGE, WISCONSIN, ASSIGNOR TO NICHOLAS POWER COMPANY, OF NEW YORK, N. Y., A CORPORATION OF DELAWARE.

INDICATING DEVICE FOR MOVING-PICTURE FILMS.

14,532. Specification of Reissued Letters Patent. Reissued Oct. 8, 1918.

Original No. 1,090,128, dated March 17, 1914, Serial No. 743,393, filed January 21, 1913. Application for reissue filed May 4, 1915. Serial No. 25,862.

*To all whom it may concern:*

Be it known that I, FRANKLIN H. AVERS, a citizen of the United States, residing at Portage, in the county of Columbia and State of Wisconsin, have invented new and useful Improvements in Indicating Devices for Moving-Picture Films, of which the following is a specification.

The invention relates to moving picture films and has for an object to provide a device which is operable by the action of the film when the same is wound upon or unwound from a film, contained in a magazine, and whereby the amount of film which is wound upon or unwound from the reel will be indicated exteriorly of the magazine, thus obviating the necessity of opening the door of the magazine to determine how much of the film has been wound upon or unwound from the reel.

The usual method of determining the amount of film which has been unwound from a reel contained in the primary magazine is to open the door of the magazine and roughly judge by the thickness of the film on the reel just how much of the film has been unwound therefrom. This method is not only inaccurate but is impractical and dangerous inasmuch as the film contained on the reel is exposed to the heat of the lantern at the moment the door of the magazine is open and if the door is left open for even a very short time the inflammable film will catch fire and burn up. To remedy this defect in the exhibition of moving pictures by means of a strip film or the like, I employ a device which is operated by the unwinding action of the film when the same is unwound from the primary reel in the upper magazine, and indicating without opening the magazine the amount of film remaining on the reel. My invention also provides means for retaining the device in an inoperative position while the reel is being removed from or inserted in the magazine.

Figure 1:
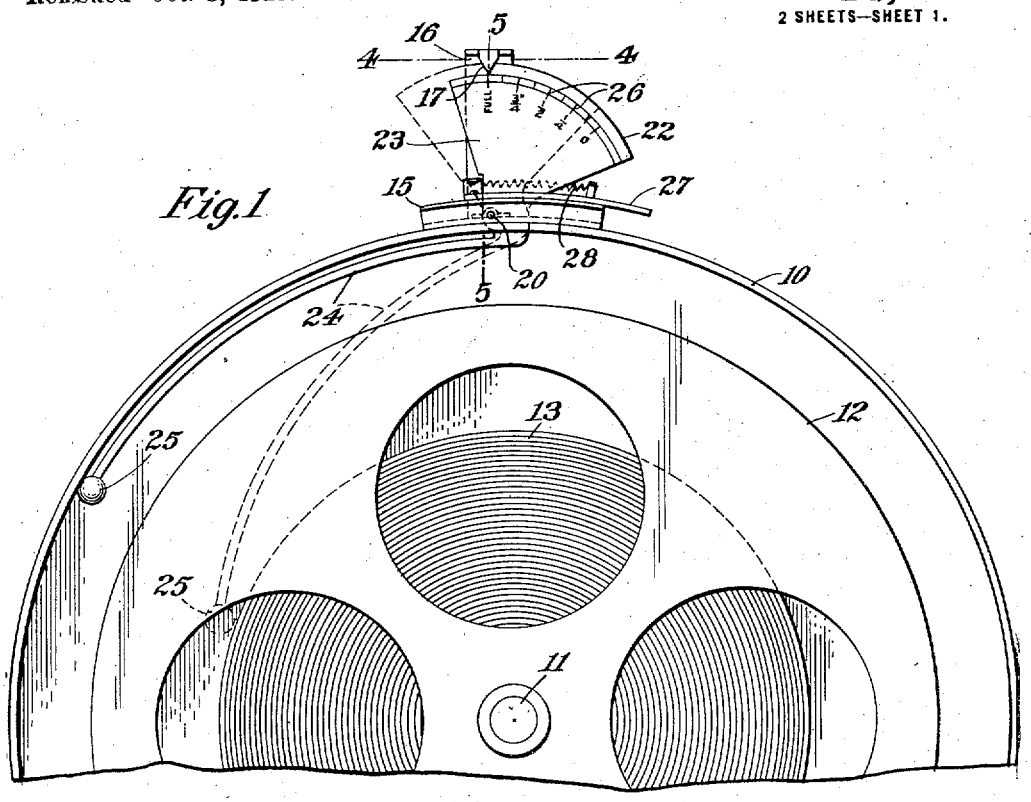
Figure 2:
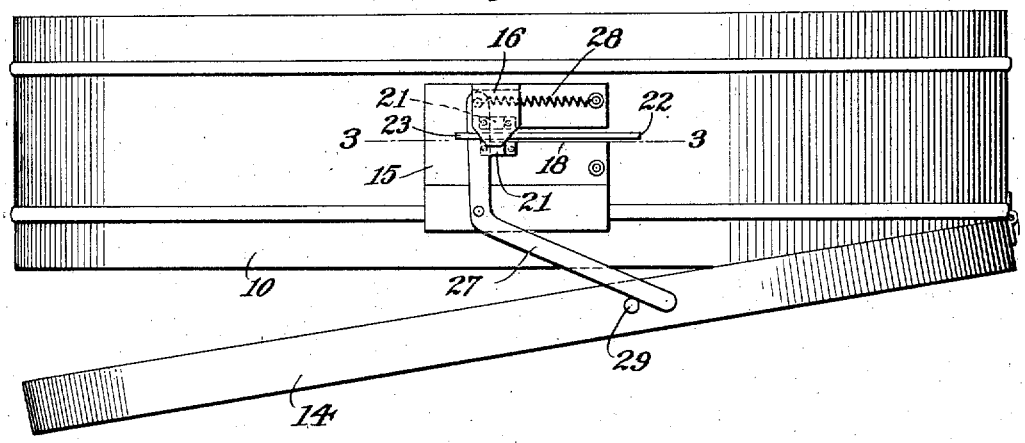
Figure 3:
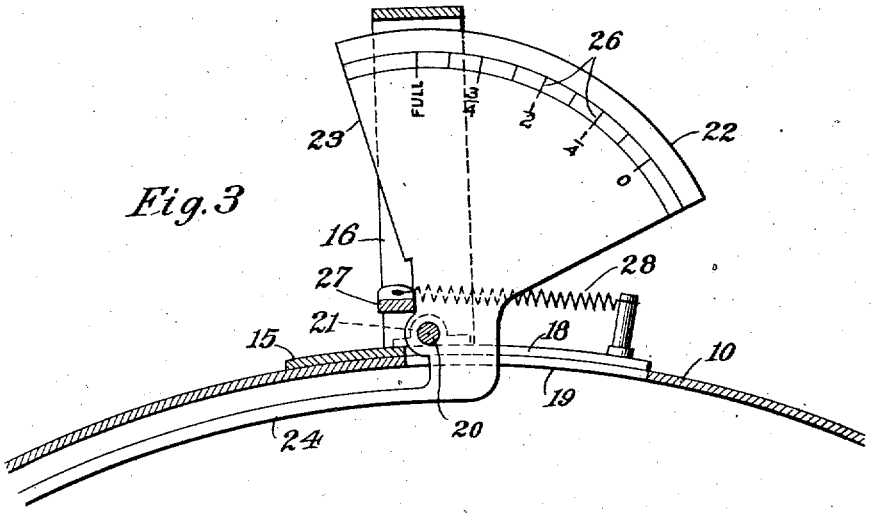
Figure 4:
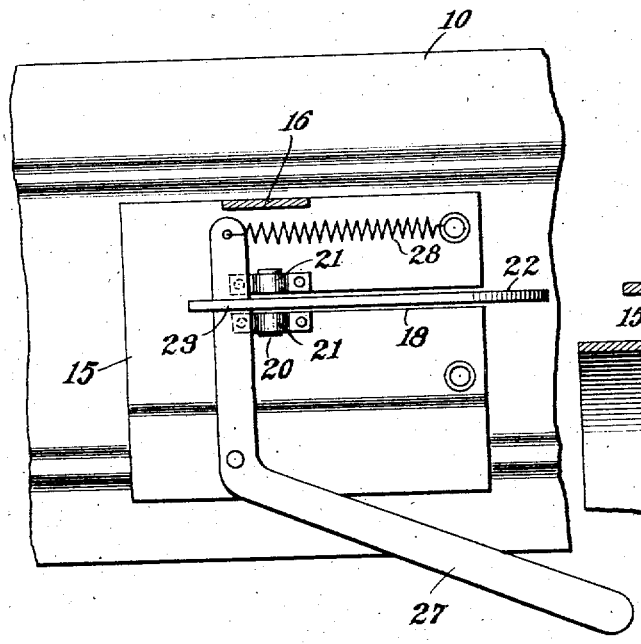
Figure 5:
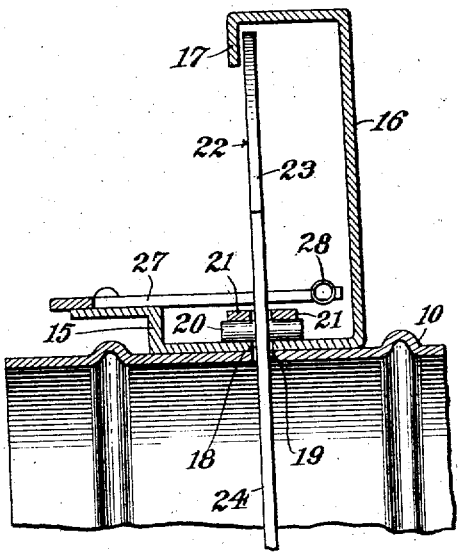

In the further disclosure of the invention reference is to be had to the accompanying drawings, constituting a part of this specification, in which similar characters of reference denote corresponding parts in all the views, and in which:

Figure 1 is a side elevation of the upper magazine, showing my device applied thereto and disclosed in operative position in dotted lines and in inoperative position in full lines, the door of the magazine being open to disclose the interior; Fig. 2 is a plan view showing the pin on the closure in position to engage the locking lever and move the same into unlocked position; Fig. 3 is a vertical sectional view taken on the line 3—3 in Fig. 2; Fig. 4 is a horizontal sectional view taken on the line 4—4 in Fig. 1; Fig. 5 is a vertical transverse sectional view taken on the line 5—5 in Fig. 1.

Referring more particularly to the views, I disclose an upper magazine 10 of the usual shape and type and provided with a spindle 11 arranged transversely in the upper magazine and adapted to normally support a reel 12 initially carrying a film 13 and preferably known as the primary reel, a door 14 being mounted to swing on the upper magazine to normally close the magazine and form a side thereof.

Rigidly supported at the top of the upper magazine 10 and exteriorly thereof is a base 15 and projecting upwardly from the base is an upright 16 terminating at the upper end in a downwardly extending pointer 17, the said pointer and upright being preferably made from a single piece of material. The base 15 is provided with a longitudinal slot 18 registering with longitudinal slot 19 in the upper magazine 10. A horizontal shaft 20 is journaled in bearings 21 supported on the base 15 and mounted to swing on the said shaft is an indicator 22 comprising an indicator plate 23 and a bar 24 terminating at its free end in a ball-like head 25 preferably made of gutta percha or some other suitable material, the said bar being curved to conform to a portion of the periphery of the upper magazine and being flattened at its upper end and at which point it is mounted to swing on the shaft 20, the indicator above the shaft being fan shaped to provide the above mentioned indicator plate 23 and which is provided with a series of graduations 26, it being readily understood that the indicator plate at its lower extremity projects through the slot 19 in the upper magazine and also passes through the slot 18 in the base 15, the indicator 22 being so mounted on the upper magazine 10 that the downwardly extending pointer 17 formed with the upright 16 will lie immediately in front of and slightly spaced from the indicator plate, as shown in Fig. 1. Now it will be apparent that when the primary reel 12, revolubly supported in the upper magazine 10, has a complete film wound thereon and which is to be unwound therefrom to be advanced through the moving picture machine, the weight of the bar 24 and head 25 thereof will cause the head 25 to engage the face of that portion of the film which is exposed on the reel as shown in the dotted lines in Fig. 1, and it will be further seen that when the head 25 engages the face of the film as mentioned, the pointer 17, will register with one of the graduations 26 on the plate 23 and which indicates, preferably by the word Full, that the complete film is wound upon the reel in the upper magazine. Now as the film is unwound from the primary reel 12 the diametrical thickness of the film will naturally decrease and, therefore, the indicator 22, tending by its weight at the lower end thereof to assume a balanced position with respect to the shaft on which it is carried, will be actuated so that the head 25 will move closer toward the hub of the primary reel as the film is unwound therefrom, and the resulting movement of the bar 24 and head 25 will cause the indicator plate to swing toward the left, thus at all times denoting, in connection with the pointer 17 and the graduations 26 on the indicator plate, how much of the film still remains on the primary reel in the magazine, so that the operator will know the moment that the end of the film is reached on the primary reel without necessitating exposing the film to the dangers of ignition from the lantern of the moving picture machine.

As mentioned heretofore, the door 14 is mounted to swing on the upper magazine 10 to close an opening in the side thereof and through which the primary reel is passed when it is placed on the spindle in the upper magazine. Now in order to return the indicator 22 to inoperative position after the same has been once employed to indicate the unwinding of the film from the primary reel a lever 27 is mounted to swing on the base 15 and project across the slot 18, with the inner end of the lever having connection with a contractile spring 28 secured to the base 15, the other end of the lever extending outwardly beyond an edge of the upper magazine and adapted to be engaged by an upwardly projecting pin 29 carried by the door 14 as shown in Fig. 2. Now when the indicator has been used in the manner mentioned heretofore to indicate at all times the amount of film unwound from the primary reel, it will be apparent that the lower portion of the indicator, namely, the bar 24 and head 25 should be returned to inoperative position and lie against the inner wall of the upper magazine and in spaced relation to the primary reel so that the primary reel can be removed from the upper magazine when the door is opened, and it will be further apparent that when the door is closed the pin 29 engaging the outer end of the lever 27 swings the lever so that the inner end thereof will lie outside of the vertical plane of the slot 18 and which constitutes the path of the indicator 23 so that the indicator plate will not be restricted in its swinging movement by the inner end of the lever, the said lever being furthermore locked in this position when the door 14 is closed and held against the contractile action of the spring 28. It will be understood that the door of the magazine is provided with the usual latch or other device, not shown, which will hold the door closed against the tension of the spring 28. Now when the film has been unwound from the primary reel and the indicator plate, together with pointer 17, denotes that this has been accomplished, the operator stops the unwinding of the film from the primary reel and opens the doors 14 to remove the primary reel therefrom. At the moment the door is swung open the pin 29 will be disengaged from the lever 27, thus releasing the lever so that the same, subject to the contractile action of the spring 28, will swing into the path of the indicator plate 26 and abut against an end of the indicator plate, thus moving the indicator plate back to inoperative position and, consequently, swinging the bar 24 and head 25 out of the range of the primary reel and against the inner wall of the upper magazine as shown in full lines in Fig. 1. The primary reel can now be easily removed from the magazine and a new reel inserted. The door is then closed and the closing of the door will again cause the pin 29 to engage the lever 27 and swing the same against the contractile action of the spring 28 and out of the path of the indicator plate 26, thus releasing the indicator so that the bar 24 and head 25 will swing downwardly within the magazine until the head engages the face of the outer end of the film carried by the primary reel, it being understood that when the head engages the face of the end of the film, the pointer 17 will register with the particular graduation 26 on the indicator plate denoting that the primary reel is full or, in other words, carries a complete film. Now as the film is unwound from the primary reel, the lower portion of the indicator will again swing inwardly toward the hub of the reel, thus swinging the indicator plate in the opposite direction and in consequence thereof the pointer 17 having the indicator plate passing behind the same will, together with the graduations 26, indicate the amount of film which is being unwound from the primary reel.

It will be understood that the device described herein is primarily employed as an indicating device for indicating the amount of film which is wound upon or unwound from a reel, it being readily seen that the device disclosed, although described as being used in connection with the unwinding of the film, can also be employed to indicate the amount of film which is wound upon the reel and it will be further understood that the device in no sense constitutes a tension mechanism for exerting the tension on the film, it being well known that devices of this character have been used heretofore for the purpose of causing the film to evenly and uniformly unwind from the primary reel.

Having thus described my invention, I claim:

1. A device for indicating the amount of film unwound from or wound on to a reel comprising a magazine containing the reel, an indicator mounted to swing on the magazine and adapted to be located according to the amount of film on the said reel to indicate exteriorly of the said magazine the amount of film unwound from or wound on to the said reel, a closure mounted to swing on the magazine to normally close the same, and means normally locking the indicator in an inoperative position and adapted to be engaged by the said closure as it closes and moved into and held in an unlocking position to release the said indicator.

2. In an indicating device for motion picture films, the combination with a film containing magazine, of a closure therefor, an indicator for indicating the amount of film removed from or advanced into the magazine, a locking element normally locking the indicator in a rigid and inoperative position, and means on the closure for moving the locking element into an unlocked position relatively to the indicator when the closure is being closed.

3. In an indicating device for motion picture films the combination with a magazine, of a film containing reel supported in the magazine, an indicator for indicating the amount of film unwound from or wound on to the said reel, a locking element normally holding the indicator in an inoperative position, and a closure for the magazine and adapted to actuate the locking element when the closure is closed to free the indicator from its inoperative position.

4. In an indicating device for motion picture films, the combination with a magazine, of a film containing reel therein, an indicator for indicating the amount of film unwound from or wound on to the said reel, a spring-actuated locking element normally holding the indicator in a locked position, a closure for the magazine, and means on the closure and adapted to engage the locking element and move the same to free the said indicator from inoperative position, when the said closure is swung into closed position relatively to the magazine.

5. In an indicating device for motion picture films, the combination with a magazine, of a film containing reel therein, an indicator for indicating the amount of film unwound from or wound on to the said reel, a spring-actuated locking element normally holding the indicator in an inoperative position, a closure for the magazine, and a pin on the closure and adapted to engage the locking element and move the same to free the said indicator from inoperative position, when the said closure is swung into closed position relatively to the magazine.

6. In an indicating device for motion picture films, the combination with a magazine, of a film containing reel therein, swinging means for indicating the amount of film unwound from or wound on to the said reel, a closure for the magazine, and an element normally holding the said means in inoperative position and operable to free the said means from inoperative position when the closure is swung into closed position on the magazine to actuate the said element.

7. The combination of a film magazine having a door forming one side thereof, means within said magazine for supporting a film reel, an indicating device for showing the quantity of film on said reel, said indicating device projecting beyond the edge of said magazine and facing toward the side having the door and comprising a stationary member attached to the magazine wall and a movable member pivoted on said magazine at a point beyond the periphery of said reel and comprising an arm to engage the film on the reel and arranged to be swung on its pivot to lie wholly beyond the periphery of said reel, one of said members being provided with a scale and the other of said members with a pointer coöperating with said scale to indicate the extent of pivotal movement of said pivoted member.

8. The combination of a film magazine having one side thereof hinged to form a door provided with means to support a reel of film, and an indicating device for showing the quantity of film within the magazine comprising a scale and pointer attached to the stationary wall of said magazine and projecting beyond the edge thereof to be read from the side of the magazine having the door, one element of said scale and pointer being movable and comprising an arm pivotally mounted on the magazine in position to rest at its free end against the circumference of the film on the reel, said arm being shaped to lie wholly beyond the periphery of said reel when swung to its outer extreme position of pivotal movement.

9. In an indicating device for a film magazine having a door on one side thereof, the combination with the magazine of means for supporting a film reel therein, a movable member mounted on said magazine and adapted to engage the periphery of the film roll between the flanges of the reel, said member being movable to a position wholly beyond the periphery of said reel, a relatively movable dial and index mounted exteriorly of said magazine, the movable part thereof being operated by said movable member within the magazine, and means on said magazine and operated upon the opening of the door thereof for adjusting said movable member to a position beyond the periphery of said reel.

Signed at Portage, in the county of Columbia and State of Wisconsin, this sixth day of March, 1915.

FRANKLIN H. AVERS.

Witnesses:

O. J. G. PETERS,

FRANKLIN G. AVERS.